United States Patent
Deo et al.

(10) Patent No.: US 11,201,932 B2
(45) Date of Patent: Dec. 14, 2021

(54) SYSTEMS AND METHODS FOR SECURELY USING CLOUD SERVICES ON ON-PREMISES DATA

(71) Applicant: Oracle International Corporation, Redwood Shores, CA (US)

(72) Inventors: Niraj Deo, Sammamish, WA (US); Saurabh Pandey, San Jose, CA (US); Johanna Christina Brugman, Seattle, WA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 17/065,238

(22) Filed: Oct. 7, 2020

(65) Prior Publication Data

US 2021/0105316 A1 Apr. 8, 2021

Related U.S. Application Data

(60) Provisional application No. 62/912,013, filed on Oct. 7, 2019.

(51) Int. Cl.
*H04L 29/08* (2006.01)
*H04L 29/06* (2006.01)
*H04L 12/46* (2006.01)
*H04L 12/24* (2006.01)

(52) U.S. Cl.
CPC .......... *H04L 67/22* (2013.01); *H04L 12/4641* (2013.01); *H04L 41/0893* (2013.01); *H04L 67/1002* (2013.01); *H04L 67/306* (2013.01); *H04L 67/40* (2013.01)

(58) Field of Classification Search
None
See application file for complete search history.

(56) References Cited

U.S. PATENT DOCUMENTS

| | | | |
|---|---|---|---|
| 2013/0073400 A1* | 3/2013 | Heath | G06F 16/29 705/14.73 |
| 2015/0294633 A1* | 10/2015 | Jung | H04L 51/32 345/212 |
| 2016/0210578 A1* | 7/2016 | Raleigh | H04L 41/0806 |
| 2017/0041381 A1* | 2/2017 | Tal | H04L 67/30 |
| 2020/0117690 A1* | 4/2020 | Tran | G06F 16/9536 |
| 2020/0394154 A1* | 12/2020 | Blackshear | H04L 9/3239 |
| 2020/0394159 A1* | 12/2020 | Hurley | H04L 9/3236 |

* cited by examiner

*Primary Examiner* — Davoud A Zand
(74) *Attorney, Agent, or Firm* — Kilpatrick Townsend & Stockton LLP

(57) ABSTRACT

The present disclosure relates to systems and methods for providing cloud-based services securely to on-premises networks or other infrastructure. More particularly, the present disclosure relates to systems and methods for enriching first-party data (e.g., data collected directly by an on-premises server) stored within on-premises networks by enabling the on-premises networks to retrieve and process third-party data stored on cloud-based networks. As a technical benefit, cloud-based services can be performed on the first-party data within the on-premises networks.

20 Claims, 9 Drawing Sheets

SYSTEMS AND METHODS FOR SECURELY USING CLOUD SERVICES ON ON-PREMISES DATA

CROSS-REFERENCE TO RELATED APPLICATIONS

This application claims priority of U.S. Provisional Patent Application No. 62/912,013 filed Oct. 7, 2019, entitled SYSTEMS AND METHODS FOR SECURELY USING CLOUD SERVICES ON-PREMISES DATA", which is hereby incorporated by reference in its entirety for all purposes.

TECHNICAL FIELD

The present disclosure relates to systems and methods for enabling on-premises networks or virtual private cloud networks to execute cloud-based services on first-party data stored securely within the domain of the on-premises networks or the virtual private cloud networks. More particularly, the present disclosure relates to systems and methods for enriching first-party user records by enabling on-premises networks or virtual private cloud networks to linking first-party user records to certain third-party user records stored on cloud-based networks.

BACKGROUND

Cloud-based networks can provide data management services to companies. Data management in the web analytics space, however, creates several technical challenges relating to data security and privacy. For example, a cloud-based network may be configured to provide data analytics tools at a large scale. Companies seeking to use the analytical tools may provide the cloud-based network with certain first-party data (e.g., user data collected by a company directly from its owned webpage's visitors or owned mobile application's users, and for which the user has provided consent), so that the cloud-based network can process the first-party data using the analytical tools. The first-party data provided by the company is often a limited subset of all available first-party data collected by the company because certain first-party data cannot be transferred to the cloud-based network without violating privacy laws (e.g., when data is collected from webpage or mobile application visitors who have not provided consent to transfer the first-party data to a cloud network).

Additionally, storing first-party data of multiple different and unrelated companies within a cloud network, however, creates significant challenges. Securely and reliably isolating the storage of first-party data for each of the multiple different companies is a significant technical challenge. For example, performing analytics on the first-party data without combining that first-party data with other first-party data of a different company is technically difficult to achieve, especially as the scale and complexity of cloud-based data storage increases at a fast pace and companies from amongst all industry verticals are digitally transforming their customer experience capabilities. Further, storing first-party data and third-party data (e.g., collected by the cloud-based network and de-identified) in a common data store can potentially create a risk of mixing the first-party data with the third-party data in a manner that violates privacy standards or laws.

SUMMARY

Certain aspects and features of the present disclosure may relate to providing an on-premises network with the capability to securely perform cloud services on sensitive information, such as first-party user data, stored locally within the on-premises network. An on-premises network may be any network (e.g., a public or private network, or a virtual private cloud-based network) operated by a company. Performing cloud services on first-party user data locally stored in on-premises network provides enhanced security and data privacy because the first-party user data is not exchanged to external systems. Additionally, certain aspects of the present disclosure enable companies to control the user data collection and profile linkages to other first-, second-, or third-party user data stored in cloud networks. For example, from the perspective of the on-premises network, the entire pool of first-party user data and any linked first-, second-, or third-party user data is accessible within a single, local domain (e.g., the domain of the on-premises network).

First-party data may be collected by the on-premises network directly from interactions between the company's webpage and user devices accessing the webpage. Metadata associated with the interactions may be stored as first-party user data within the on-premises network. The on-premises network may maintain exclusive control of the cloud-based services performed on the first-party user data that is stored within the on-premises network. Thus, the on-premises network can securely make use of cloud-based services, such as data management and web analytics, on the first-party data without uploading the first-party data to a cloud network. As a non-limiting example, a cloud service may include the functionality of enriching first-party user profiles by probabilistically linking the first-party user profiles to certain third-party user data associated with third-party user profiles. The enriched first-party user profiles may be transformed into first-party ID graphs, such that the first-party ID graph represents other user attributes included in the third-party data.

The on-premises network may be independent of the cloud-based network that provides the cloud-based services. The cloud-based network may enable companies to perform cloud-based services on third-party data stored within the cloud-based network (e.g., aggregated and de-identified online behavior data that cannot be used, as it exists, to identify an individual user or user device). First-party data may be data collected by the company directly from interactions between the company's webpage and the webpage's visitors. First-party data often includes personally-identifiable information (PII), and thus, triggers certain safeguards provided by privacy laws. The collected first-party data cannot be transferred to external systems without user consent. Certain embodiments provide a technical solution to the technical constraints imposed by privacy laws by enabling the on-premises network exclusive control of the cloud-based services performed on the first-party data that is stored within the on-premises network. Thus, as an advantage, the first-party data collected by a company no longer needs to be uploaded to the cloud-based network and shared data stores to make use of the cloud-based services. Further, according to certain embodiments, companies can perform the cloud-based services on the entire collection of first-party data, whereas, in previous solutions, companies could only perform cloud-based services on a limited subset of first-party data because only that limited subset of first-party data could be uploaded to the cloud-based network without violating privacy laws.

In some implementations, the cloud-based network (e.g., Oracle Data Cloud (ODC)) may transmit the executable code underlying the cloud-based services to the on-premises network for execution. Executing the executable code (e.g., by an on-premises server within the on-premises network) may cause a private pixel server to be configured within the on-premises network. The private pixel network may enable the company to track activity on the company's webpage by collecting and storing first-party data securely within the on-premises network (e.g., at a first-party profile database configured as a result of executing the executable code). Further, executing the executable code may cause an interface to be generated. The interface may enable a user of the company (e.g., an employee of the customer of Oracle) to control or configure the performance of one or more cloud-based services (e.g., analytical processes, such as business intelligence analytical tools) on the first-party data stored within the on-premises network (e.g., a customer-controlled storage, network, and computing infrastructure). For example, executing the executable code may cause an administrative control layer of the cloud-based services to be established, which exclusively enables the user to define configurations of the cloud-based services. The executable code may generate an interface that provides the user with access to the administrative control layer. In some implementations, the interface may enable the user to configure the private pixel server by generating access keys that provide access to the first-party data stored within the on-premises network. The access keys may not be shared with the cloud-based network or the cloud-based services, and thus, the first-party data stored within the on-premises network cannot be accessed outside of the on-premises network.

In some implementations, the executable code can configure an application programming interface (API) that enables the on-premises network associated with the company to enrich the collected first-party data by retrieving certain anonymous third-party data from the cloud-based network. Enriching the first-party data may include retrieving from the cloud-based network third party data associated with one or more third-party user IDs that are linked to a first-party user ID, and extending a first-party user profile associated with the first-party user ID by appending the third-party data. The established link may be revocable. As an illustrative example, a mobile device may access the company's webpage, the company's mobile application, or the company's mobile webpage. The private pixel server associated with the web server hosting the company's webpage may generate an anonymous mobile device ID representing the mobile device is browsing session on the company's webpage. The web server may collect certain data from the mobile device's browsing session (e.g., Internet Protocol (IP) address, browser version, geographical location, and other suitable and regionally permissible information). The collected data may be stored at a first-party profile database within the on-premises network. The first-party profile database may be configured because of executing the executable code within the on-premises network. Further, the collected data may be stored at the first-party profile database in association with the anonymous mobile device ID. The on-premises network may initiate a call directly to the cloud-based network using the API. The call may correspond to a request to the cloud-based network for any third-party user IDs or third-party data associated with the anonymous mobile device ID. In this example, the webpage visitor associated with the anonymous mobile device ID may have provided consent to collect and process browsing data. The request may also include a portion of the first-party user data associated with the anonymous mobile device ID. The webpage visitor may have consented to the transmission of the portion of the first-party data to the cloud-based network for processing. The cloud-based network may query the common profile data store for any known linked third-party user IDs using deterministic linkage techniques and the portion of the first-party data. Identifying third-party user IDs that are linked to the anonymous mobile device ID may involve a probabilistic determination that the third-party user IDs and the anonymous mobile device ID correspond to the same user. The probabilistic determination may include a triangulation technique that is associated with a confidence score, but safely short of re-identification of a specific user, thus complying with intent of privacy rules and regulations. The larger the size of the portion of the first-party data that is transmitted to the cloud-based network, the greater the confidence will be in probabilistically determining linked third-party user IDs. In return, the cloud-based network may transmit any identified third-party user IDs that are deterministically linked to the anonymous mobile device ID. The third-party data associated with the linked third-party user IDs may also be transmitted from the cloud-based network to the on-premises network using the API. The on-premises network may now enrich the first-party data associated with the anonymous mobile device ID using the third-party data. For example, enriching the first-party data may include linking the third-party data associated with the linked third-party user IDs to the first-party ID graph of the anonymous mobile device ID, such that the first-party ID graph represents any other characteristics included in the third-party data, such as other devices used by the user operating the mobile device. Enriching the first-party data may also include extending the first-party user profile associated with the anonymous mobile device ID by appending the third-party data to the profile, so that any future processing of the first-party user profile includes the third-party data. As another example, the third-party data may be used to update the first-party data. The updating may be based at least in part on the established link between the first-party user ID and the one or more third-party user IDs.

In some implementations, executing the executable code on an on-premises server within the on-premises network may generate an interface with an API that is configured to exchange data between the on-premises network and the cloud-based network. As an illustrative example, the user may use the interface to select a portion of the first-party data that can be uploaded to the cloud-based network, and to select another portion of the first-party data that is not to be uploaded to the cloud-based network, but rather, that is not transferred outside of the on-premises network. The portion of the first-party data that is selected or flagged as uploadable data may include first-party data for which the underlying webpage visitors provided consent to share or transfer outside of the on-premises network. For example, first-party data may include a string of a set of user features collected from webpage visitors, mobile app visitors, or mobile webpage visitors (e.g., IP address or geographic location, device information, family size, sports of interest, etc.). A subset of the set of user features may be uploaded to the cloud-based network, given that the webpage visitor from which the subset of user features was collected provided consent to upload the data. The subset of user features of the first-party data may be processed by the cloud-based network to map the subset of user features to third-party user IDs or to third-party data (e.g., including one or more user features). The mapping between the subset of user features from the first-party data and the third-party user IDs or third-party data may be performed using probabilistic techniques for matching user profiles. When the cloud-based network identifies third-party user IDs or third-party data that are matched to or are mapped to the subset of user features of the first-party data, the cloud-based network generates a data set that includes the identified third-party user IDs or third-party data and a confidence score. The confidence score indicates a probability that the third-party user IDs or the third-party data corresponds to the same webpage visitor as the webpage visitor associated with the subset of user features from the first-party data. In some implementations, the API may be configured as a real-time API that can continuously deliver linked third-party data to the on-premises network. For example, as new third-party data is collected or as the third-party data changes over time due to online activity, the third-party user IDs and the third-party data that are mapped to a first-party user ID or mapped to a subset of user features of the first-party data can be transmitted to the on-premises network using the API. The on-premises network may obtain consent and permissions from one or more webpage visitors to transfer their first-party data to the cloud-based network for processing. The API enables the user to upload first-party data for which a consent is stored within the on-premises network. In this implementation, the webpage visitors associated with the uploaded first-party data may have provided their consent (in advance) to transfer their first-party data to the cloud-based network for further processing.

In some implementations, the interface may be configured to enable the user (e.g., the employee of the company) to define settings for monitoring the use of the API for billing purposes. As an illustrative example, the user may define a maximum value (e.g., a billing cap or threshold) for billing the company for interacting with the cloud-based network. Each instance the on-premises network requests the cloud-based network for third-party user IDs that are linked to one or more first-party user IDs, the company may be charged a fee. When the maximum value has been charged to the company over multiple API requests, the cloud-based network may inhibit, block or deny any future requests for third-party data from the on-premises network. In some implementations, a request from the on-premises network may be detected when the on-premises uploads a subset of user features of first-party data to the cloud-based network using the API. The upload may be detected at the cloud-based network and tracked. For example, before the cloud-based network performs a mapping of the subset of user features of the first-party data to the third-party data, the cloud-based network may request a confirmation from an accounting system within the cloud-based network. The request for confirmation may request whether or not the cloud-based network is authorized to proceed with mapping the first-party data with the third-party data for the company. When the accounting system receives the request, the accounting system may access a database that stores the previous instances in which the company requested a mapping of first-party user IDs to third-party user IDs. The accounting system may store the maximum value defined by the user of the company and determine whether the maximum value has been met. If the maximum value has already been charged to the company or if the processing of the present request for third-party data would cause the maximum value charged to be exceeded, then the accounting system may respond to the request for confirmation with a negative response indicating that the cloud-based network cannot proceed with completing the mapping of first-party user IDs to third-party data. If, however, the maximum value charged after mapping the first-party user IDs to the third-party data would not be exceeded, then the accounting system may respond to the request for confirmation with a positive response indicating that the that the cloud-based network can proceed. In some implementations, the user may modify the maximum value at any time, as long as the maximum value has not already been reached.

In some implementations, the interface accessible from within the on-premises network may enable the user to select one or more cloud-based services to perform on the first-party data stored within the on-premises network. Additionally, the interface may enable the user to define configuration settings of one or more of the cloud-based services. As an illustrative example, the interface may provide the user with access to a first-party workspace, in which the user can control and configure the performance of the cloud-based services. The first-party workspace may be a networking environment, which stores the configurations of the various cloud-based services and enables the user to select cloud-based services to perform and to modify the configurations of the cloud-based services. The first party workspace may enable the user to access first-party data stored within the on-premises network and to select a portion of the first-party data for which consent has been provided to upload to the cloud-based network. The user may also select a portion of the first-party data that cannot or should not be uploaded to the cloud-based network. The first-party workspace may also be configured to automatically detect or filter the first-party data for which a consent has been stored, so that the user can easily view the first-party data that can be uploaded to the cloud-based network. The first-party workspace may also enable the user to select or download a suite of analytical tools into the on-premises network, if the suite of analytical tools is not already included in the executable code received from the cloud-based network. As another illustrative example, the user can define the configuration settings for a churn analysis, and then initiate the performance of the churn analysis on at least a portion of the first-party data. Additionally, the user can select one or more first-party user IDs to target in a marketing campaign. For example, the first-party workspace may compile the selected first-party user IDs into a data set together with the third-party data that is linked to the selected first-party IDs. The compiled data set (e.g., the first-party user IDs and the linked third-party user IDs) can then be transmitted to external systems, such as a social media network to be the subject of a marketing campaign. In this example, the webpage visitors associated with the first-party user IDs may have provided consent in advance to be the subject of marketing campaigns. Additionally, the first-party workspace may enable the user to perform the selected cloud-based services. In some implementations, performing the cloud-based services may cause the on-premises network to transmit a request call using the API to the cloud-based network for the code underlying the selected cloud-based service. The cloud-based network may transmit the code underlying the selected cloud-based services back to the on-premises network for execution using the first-party data stored within the on-premises network. In some implementations, the code underlying the selected cloud-based service may be stored within the on-premises network. In either implementation, the on-premises may transmit calls to the cloud-based network to retrieve certain third-party data on-demand as required by the cloud-based service. The third-party data may be received back at the on-premises network using the API, and the first-party workspace may link the received third-party data to the linked first party data.

As a technical advantage, data security is enhanced because the on-premises network can leverage cloud-based services on data located within the boundary of the on-premises network. As an added benefit, the analytical tools provided by the cloud-based network can be performed on the entire set of first-party data, in some cases regardless of whether website visitors have provided consent, because the first-party data may not be transferred outside of the on-premises network.

BRIEF DESCRIPTION OF THE DRAWINGS

The specification makes reference to the following appended figures, in which use of like reference numerals in different figures is intended to illustrate like or analogous components.

DETAILED DESCRIPTION

Figure 1:
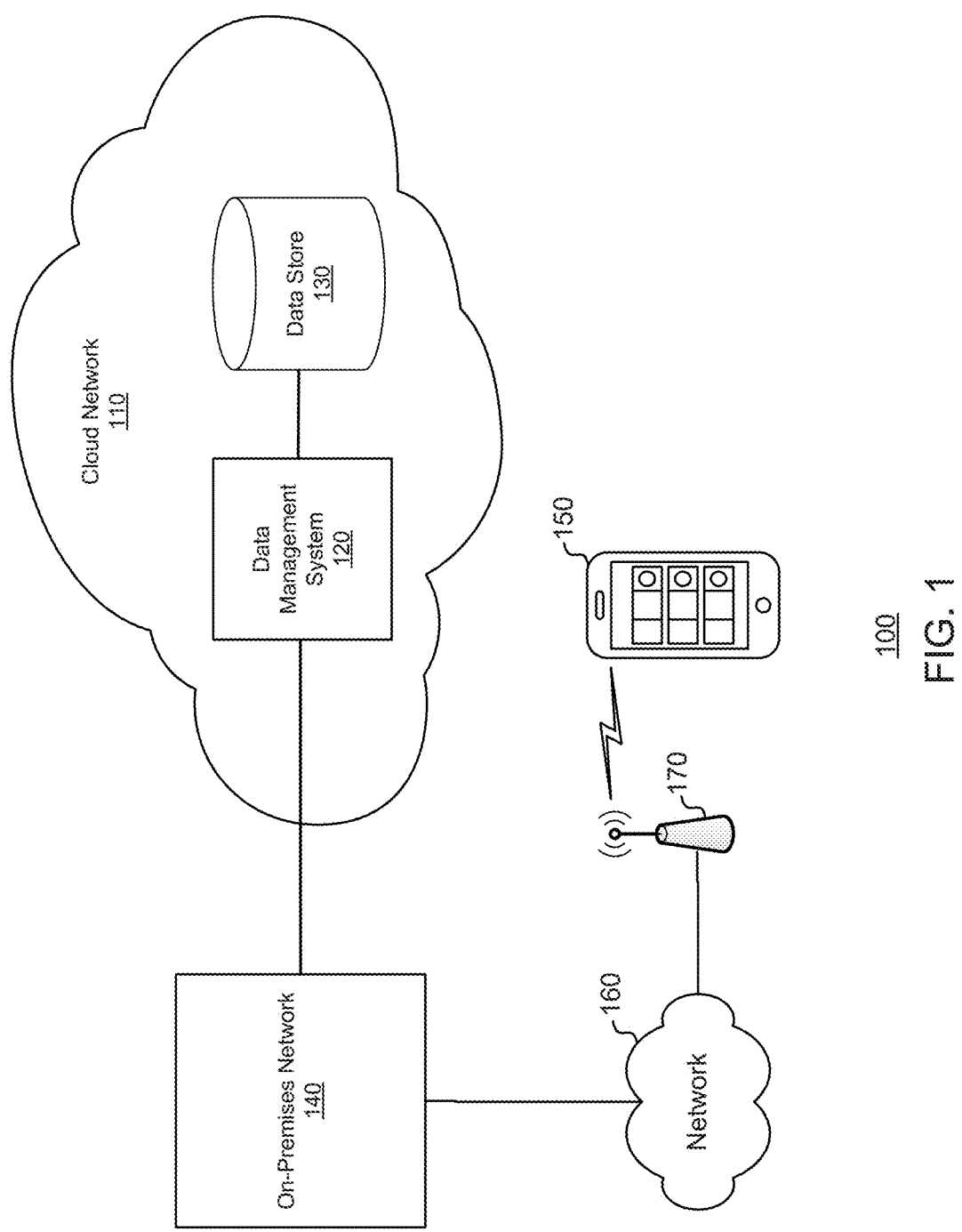
FIG. 1 is a block diagram illustrating an example of a network environment, according to some aspects of the present disclosure.

FIG. 1 is a block diagram illustrating an example of a network environment, according to some aspects of the present disclosure. Network environment 100 can include cloud network 110, on-premises network 140, network 160 and user device 150. In some implementations, cloud network 110 can be a cloud-based network that includes data management system 120. Data management system 120 can be configured to execute one or more cloud services, such as business intelligence analytics and other suitable web analytics functionality. While user device 150 is illustrated as being a mobile computing device (e.g., a smartphone), it will be appreciated that user device 150 can be any portable (e.g., laptop, tablet computer, etc.) or non-portable (e.g., desktop computer, electronic kiosk, etc.) computing device. It will also be appreciated that any number of user devices (of any type) can be included in network environment 100. User device 150 can communicate with on-premises network 140 through network 160 (e.g., any public or private network, such as the Internet). For example, user device 150 can connect to network 160 using gateway 170, which enables the user device 150 to interact with on-premises network 140 through network 160.

User device 150 can be operated by a user. For example, user device 150 may be operated by the user to interact or communicate with on-premises network 140. User device 150 may interact with the on-premises network 140 to, for example, manage a website associated with the on-premises network 140 or to perform functionality, such as web analytics, on first-party user data collected by the on-premises network 140. The first-party user data can be any information relating to a website visitor or to a computing device associated with the website visitor. In certain circumstances, web analytics functionality that can be performed by on-premises network 140 may be limited, given that the scope of the results of the web analytics is based on the scope of the first-party user data collected by the on-premises network 140. To enhance the user data available for analyzing, the on-premises network 140 can communicate with data management system 120 of the cloud network 110. For example, data management system 120 may transmit cloud-based software (e.g., executable code) to on-premises network 140. The cloud-based software may, when executed at the on-premises network 140, provide the on-premises network 140 with the capability to securely perform cloud-based services on first-party data stored locally within the on-premises network 140.

Additionally, the cloud-based software may enable on-premises network 140 to maintain exclusive control of the cloud-based services performed on the first-party data that is stored within the on-premises network 140. Thus, the on-premises network can securely make use of cloud-based services, such as data management and web analytics, on the first-party data without uploading the first-party data to cloud network 110.

In some implementations, the cloud-based services may enable on-premises network 140 to perform certain cloud-based services on user data (e.g., third-party user data, which includes aggregated and de-identified online behavior data that cannot be used, as it exists, to identify an individual user or user device) stored within the data store 130 included in the cloud network 110. Data store 130 can store any type of user data, including first-party user data, second-party user data, or third-party user data. The cloud-based services may also map certain first-party user data to at least a portion of the third-party user data stored in data store 130 to provide enriched user data to on-premises network 140 for enhanced web analytics performed directly at the servers within on-premises network 140.

Figure 2:
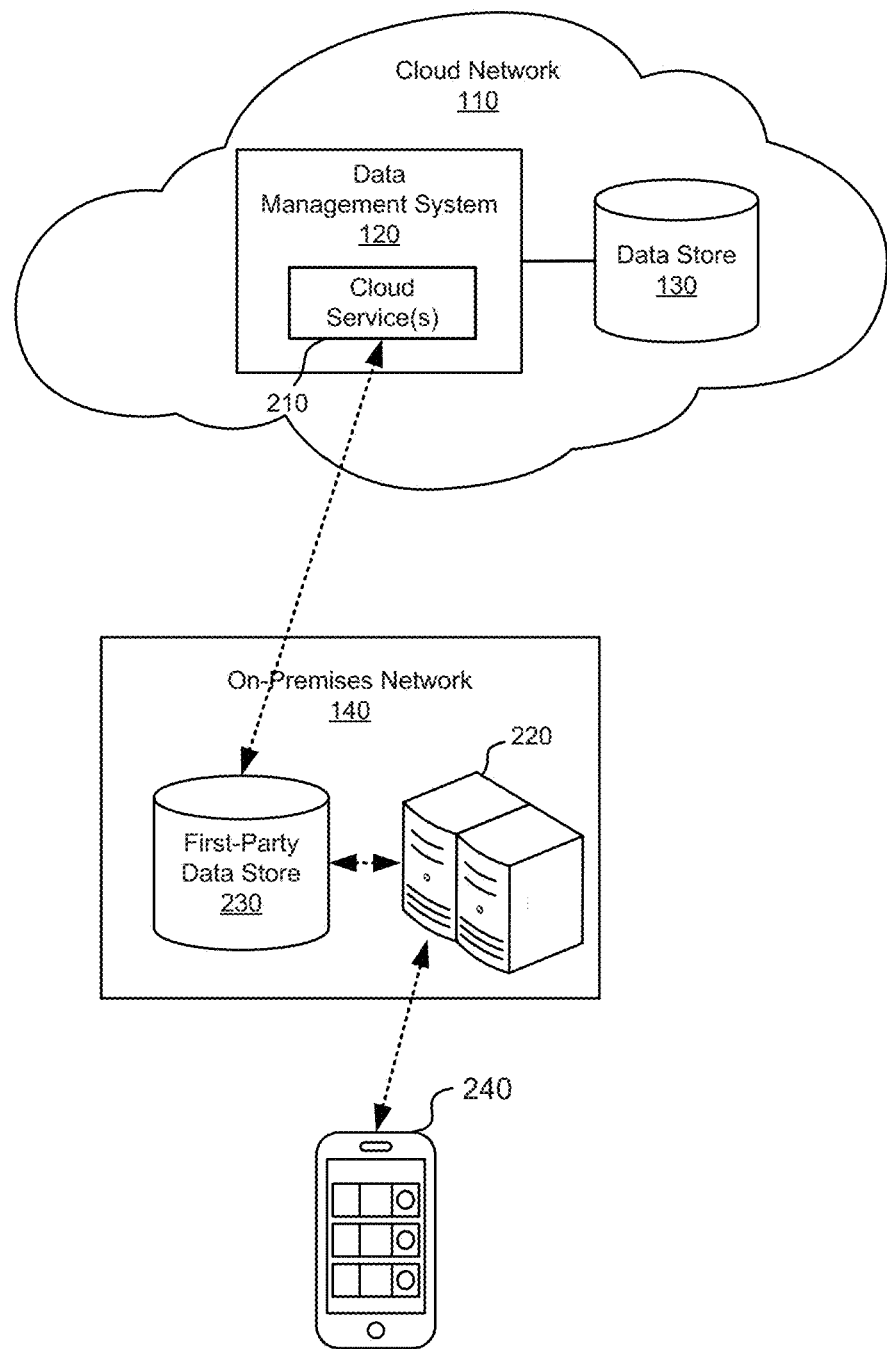
FIG. 2 is a block diagram illustrating another example of a network environment, according to some aspects of the present disclosure.

FIG. 2 is a block diagram illustrating another example of a network environment for securely providing cloud services to on-premises networks for performing the cloud services on first-party data stored locally within the on-premises networks. Network environment 200 may include user device 240, cloud network 110, and on-premises network 140. Cloud network 110 may be a cloud-based network (as illustrated in FIG. 1) that includes cloud-based data management system 120 (e.g., Oracle Data Cloud). Cloud-based data management system 120 may be configured to execute cloud services 210 on first-, second-, or third-party data stored in data store 130 within cloud network 110. Cloud services 210 may be performed by executing source code of one or more applications. Further, cloud services 210 may provide certain functionality to end users. For example, the functionality provided by cloud services 210 can include business intelligence analytics, mapping first-party user IDs to one or more third-party user IDs and third-party data stored in data store 130, generating first-party ID graphs, and other suitable web analytics functionality.

On-premises network 140 may transmit a digital communication to data management system 120. Transmitting the digital communication can be initiated or triggered by a user operating a user device interacting with on-premises network 140, such as user device 150 illustrated in FIG. 1. The digital communication may represent a request to enable on-premises network 140 to perform one or more cloud services 210 using first-party data stored locally at on-premises network 140 without uploading the first-party data to cloud network 110. Cloud-based data management system 120 may transmit executable code (e.g., cloud-based software) to on-premises network 140. The executable code may, when executed by a server that is connected locally within the on-premises network 140, cause the configuration of private pixel server 220 and first-party data store 230. Further, executing the executable code by a server that is locally connected within on-premises network 140 may cause an interface to be generated and accessible to a user device, such as user device 150. The interface can be navigated by a user of the on-premises network 140. The interface can enable the user to select and/or configure certain cloud-based services 210 to be available for performing on the first-party data stored in first-party data store 230, which is local to on-premises network 140. The selected cloud services 210 can be performed locally within on-premises network 140, without needing to upload the first-party data to data management system 120. In some implementations, the first-party data stored in the first-party profile data store 230 may not be accessible to any computing device within the cloud network 110, however, the one or more cloud services 210 may be performed on the first-party data by computing devices within on-premises network 140.

On-premises network 140 may be a public, private, virtual private cloud-based network, or other cloud-based network that is independent from cloud network 110. To illustrate and only as a non-limiting example, on-premises network 140 may be a private network of a company. The private network can operate (e.g., host) the company's webpage(s). On-premises network 140 may include a private pixel server 220 that monitors and facilitates the collection of data from browsers of webpage visitors to the company's webpage(s). On-premises network 140 may also include first-party data store 230. When user device 240 loads the webpage hosted by the company (e.g., by accessing the company's web server), the loading of the webpage is detected by private pixel server 220. Private pixel server 220 then collects data from various interactions between user device 240 and the company's webpage. Non-limiting examples of data that can be collected directly from an interaction between user device 240 and the company's webpage may include IP address, device information, browser type, browser version, type and version of Operating System, timestamps of interactions, screen resolution, any clicks or taps, content viewed, webpages access, and any other suitable data. The private pixel server 220 may store the collected first-party data in first-party data store 230 in association with a first-party user ID. The first-party user ID can be a unique identifier of a known user (e.g., when a user logs into the company's webpage, then the company knows the exact identity of the user) or may be an anonymous identifier (e.g., a mobile device user accessing the company's webpage and not logging in, and thus, the company does not know exactly the identity of the user). An example of using first-party data may include building relationships with specific customers, presenting privacy contracts to customers, managing customer data regardless of contract, sharing customer data with others according to terms on a person-by-person basis, and so on. An example of using third-party data may include managing customer data from one or a variety of first parties, sharing only according to terms of contract from first-party, also share summaries of data (e.g., demographics) that do not identify individuals but are useful when making judgments about larger sets of data encompassing a variety of individuals, for example, those in a region. Mapping between individual user profiles and summary demographic information to individual profiles known by the first party to belong to a certain demographic can enrich user profiles.

Figure 3:
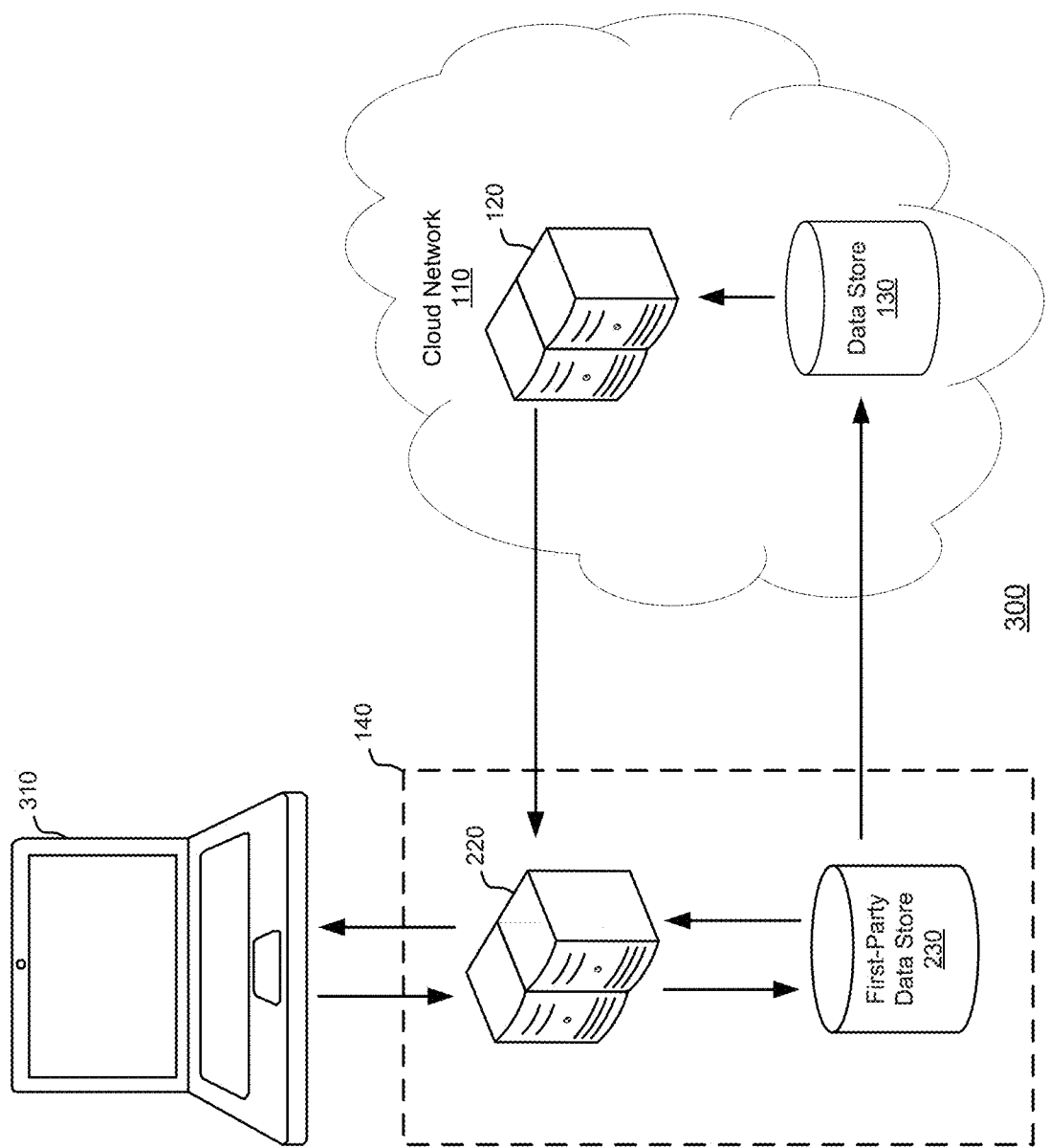
FIG. 3 is a block diagram illustrating an example of a network environment, in which an entity-controlled cloud service can be performed on first-party data stored within an on-premises network, according to some aspects of the present disclosure.

FIG. 3 is a block diagram illustrating another network environment 300 for providing cloud-based services to on-premises network 140 to enable on-premises network to perform cloud services (e.g., cloud services 210) on first-party data stored within the on-premises network 140. Network environment 300 may include cloud network 110, on-premises network 140, and user device 310. User device 310 can be any end user device that is operated to access a company's webpage (e.g., by accessing the company's web server(s) to load the webpage). Upon loading the webpage on user device 310, private pixel server 220 detects the interactions between user device 310 and the webpage. Private pixel server 220 can then collect data associated with the interactions between user device 310 and the webpage. For example, the collected data includes the IP address, geographic location, device information, browser version, links selected, time on webpages, consent events, on-site behavior information, and other suitable data from interactions between user device 310 and the webpage. The user data collected by private pixel server 220 can be stored in first-party data store 230, which is local to on-premises network 140.

Once private pixel server 220 and first-party data store 230 are established, cloud services 210 can be performed on the first-party data stored in first-party data store 230. As a non-limiting example, a cloud service provides functionality for linking at least a portion of first-party data stored in first-party data store 230 with a portion of third-party data stored in data store 130 of cloud network 110. The functionality of the cloud service can identify third-party data that matches first-party user profiles of the first-party user data using one or more first-party-to-third-party linkage techniques. The identity techniques may include identity linkage techniques, probabilistic linkage techniques, deterministic linkage techniques, or any other suitable linkage techniques for linking first-party user data with third-party user data. In some implementations, cloud network 110 may perform the linkage techniques. Any third-party user data that is identified as matching the first-party user data may be transmitted from cloud network 110 to on-premises network 140, for example, using an Application Programming Interface (API).

In some implementations, a portion of a first-party user record of the first-party user data may be uploaded to cloud network 110 to perform the probabilistic user profile linkages between the first-party user record and third-party user data stored in data store 130. For example, a subset of non-unique data elements of the set of data elements in a first-party user record is uploaded to cloud network 110 to perform the user profile linkage techniques.

In some implementations, private pixel server 220 and first-party data store 230 may be configured in a virtual private cloud that is specific to on-premises network 140. In these implementations, instead of configuring private pixel server 220 and first-party data store 230 locally within on-premises network 140, the virtual private cloud may be accessible by components (e.g., servers) or users of on-premises network 140, but not accessible by cloud network 110. The virtual private cloud may use end-to-end encryption techniques for network isolation and traffic isolation, so that only on-premises network 140 (and users or servers thereof) can access the private pixel server 220 or the first-party data store 230.

Figure 4:
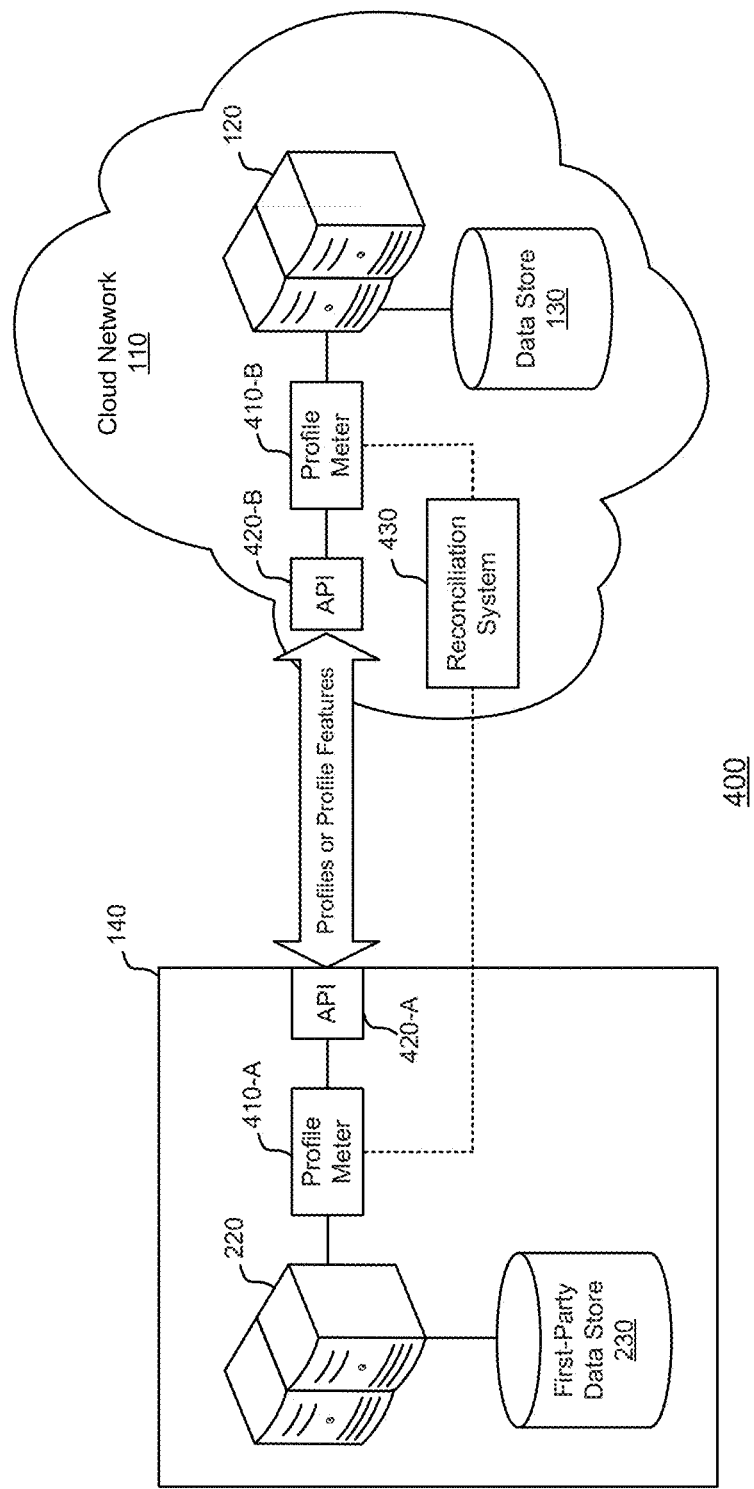
FIG. 4 is a block diagram illustrating an example of a network environment, in which user records are exchanged between an on-premises network and a cloud network, according to some aspects of the present disclosure.

FIG. 4 is a block diagram illustrating an example of a network environment 400, in which user records are exchanged between on-premises network 140 and cloud network 110, according to some aspects of the present disclosure. In some implementations, a cloud service 210 can be configured to perform profile linkage techniques, which identify third-party user data that probabilistically or deterministically matches specific first-party user records. When third-party user data is identified using the linkage techniques, an API may be used to transmit the identified third-party user data from cloud network 110 to on-premises network 140 for further processing (e.g., to include in an enriched first party ID graph). For example, the identified third-party user data is transmitted from cloud network 110 to on-premises network 140 using API 420-B.

In some implementations, the third-party user data that is transmitted from cloud network 110 to on-premises network 140 can be metered (e.g., monitored or tracked for the purpose of charging the company associated with on-premises network 140). For example, profile meter 410-A is implemented using executable code that, when executed by a server, tracks the requests for third-party user data that are transmitted out of on-premises network 140 using API 420-A (e.g., representing the company's usage statistics). Cloud network 110 can also track responses to the requests received from on-premises network 140. At a regular or irregular time interval (e.g., monthly), the number of requests captured by profile meter 410-A can be reconciled with the number of responses captured by profile meter 410-B using reconciliation system 430. In some implementations, reconciliation system 430 can compare the value generated by profile meter 410-A with the value generated by profile meter 410-B. A fee is then charged to the company associated with on-premises network 140 based on the reconciled value. In some implementations, if the reconciliation system 430 determines that the value generated by profile meter 410-A matches the value generated by profile meter 410-B, then reconciliation system 430 (or any other hardware component) can generate an invoice with the fee for charging the company associated with on-premises network 140. If the value generated by profile meter 410-A does not match the value generated by profile meter 410-B, then reconciliation system 430 may perform one or more tasks for selecting a value for including in the invoice. For example, reconciliation system 430 may select the highest or lowest value from amongst the value generated by profile meter 410-A and the value generated by profile meter 410-B. Advantageously, when the scope of the data grows much larger (e.g., to a big-data scale), reconciliation system 430 enables the metering to be performed with accuracy and consistency, even if there are small discrepancies between the values generated by profile meter 410-A, which are at a big-data scale, and the values generated by profile meter 410-B, which are also at a big-data scale.

The data supply chain for a company can be complex, for example, because the user data received by the company can include first-party user data from a first source (e.g., webpage visitors visiting the company's webpage directly), second-party user data from a second source (e.g., user data received from vendors), and third-party data from a third source (e.g., user data received from cloud network 110). According to certain implementations, performing metering of user data in the data supply chain can keep track of the distribution of the contributions of user data from each of the first source, the second source, and the third source. Further, the metering described herein can be performed to determine, for example, how much third-party user data was received at on-premises network 140 and used in a marketing campaign. For example, profile meter 410-A can perform metering of user data received from the first source (e.g., directly from the company's private pixel server), the second source (e.g., from a vendor), and the third source (e.g., cloud network 110). In some implementations, profile meter 410-A may perform metering for each of the first source, the second source, and the third source. In other implementations, a profile meter may be configured for each of the first source, the second source, and the third source. It will be appreciated that any number of sources and any type of source (e.g., first-party, second-party, or third-party) can be used in an implementation.

In some implementations, profile meter 410-A and/or profile meter 410-B may be deployed using executable code. The API can exchange the user data between on-premises network 140 and cloud network 110. Exchanging user data between, for example, cloud network 110 and on-premises network 140 can trigger the code execution to calculate the invoice amount or the spend amount. In some implementations, user data transmitted from cloud network 110 to on-premises network 140 can include third-party user profiles that are non-unique, but that are determined to be linked or matched to certain first-party user records stored within on-premises network 140. In other implementations, the user data transmitted from cloud network 110 to on-premises network 140 can include user or profile features (and not the entire user record or profile). In some implementations, a maximum total amount or size of third-party user data may be used to cap the exchanging of third-party user data between cloud network 110 and on-premises network 140. The maximum total amount or size of third-party user data can be defined by a user of on-premises network 140 or by a user of cloud network 110. In some implementations, when metering is performed (e.g., by both profile meter 410-A of on-premises network 140 and profile meter 410-B of cloud network 110), the type of computing device associated with the third-party user data can also be tracked and capped. For example, tracking third-party user data representing SmartTV users may be segmented from tracking third-party user data representing mobile or desktop users. Other types of third-party user data that can be stored, exchanged, tracked, or capped may include Internet of Things (IoT) data, vehicle telemetry associated with a driver, and other suitable types of user data. To illustrate and only as a non-limiting example, the maximum total may be 3 TB for third-party user data representing the behavior of mobile device users.

Figure 5:
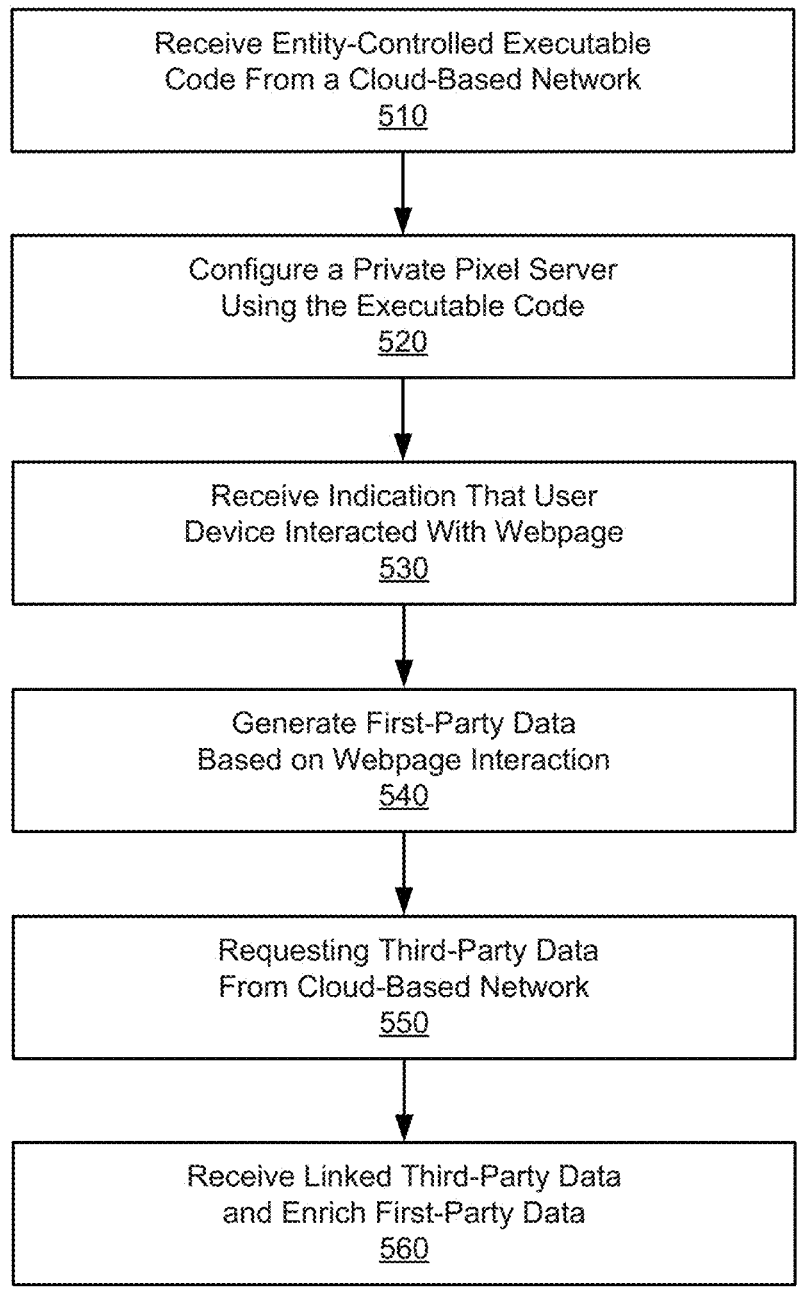
FIG. 5 is a flowchart illustrating an example of a process for enriching first-party data stored within an on-premises network with third-party data stored within a cloud-based network, according to some aspects.

FIG. 5 is a flowchart illustrating an example process 500. Process 500 may be performed at least in part, for example, by on-premises network 140 or any of the components described in FIG. 1, 2, or 3. Further, as an example, on-premises network 140 can perform process 500 to provide a company with the capability to link its first-party user data with third-party user data stored in data store 130 within cloud network 110. Process 500 enables data management system 120 to provide multi-tenant and compartmentalized cloud services securely to companies, without requiring the companies to upload their first-party user data to cloud network 110. Thus, the performance of cloud services on the first-party user data is local to on-premises network, and thus, more secure. Additionally, companies can be provided with the ability control the data collection and profile linkages to the third-party user data stored in cloud network 110. From the perspective of on-premises network 140, the entire pool of first-party user data and linked third-party user data can be viewed and is accessible in a single, local domain (e.g., the domain of the on-premises network 140).

At block 510, on-premises network 140 can receive entity-controlled executable code from cloud network 110. For example, entity-controlled executable code can include code that, when executed by a server that is local to on-premises network 140, the execution of the code may cause one or more cloud services to be performed locally within on-premises network 140. In some implementations, the execution of the entity-controlled executable code can be performed at a virtual private cloud controlled by the company, instead of being performed at on-premises network 140. For instance, if the company owns its own data center within on-premises network 140, then the entity-controlled executable code may be performed within on-premises network 140. In other situations, if the company leases a cloud implementation from, for example, an Infrastructure as a Service company, then entity-controlled executable code can be transmitted to and executed within a virtual private cloud exclusively operated by the company.

At block 520, on-premises network 140 may execute the entity-controlled executable code, which also automatically configures a private pixel server uniquely associated with on-premises network 140. The execution of the entity-controlled executable code may also automatically configure a first-party data store, such as first-party data store 230.

At block 530, on-premises network 140 may receive an indication (e.g., in real-time) indicating that a user device has or is accessing the company's webpage or an associated webpage. For example, the loading of the webpage on the user device triggers a signal to the private pixel server, which tracks the behavior of the webpage visitor.

At block 540, the private pixel server collects first-party user data from the user device that loaded and interacted with the webpage. The first-party user data can be stored in a data store, such as first-party data store 230. At block 550, a cloud service may be executed locally within on-premises network 140 (or within the virtual private cloud exclusively controlled by the company associated with on-premises network 140) to request third-party user data from data store 130. The cloud service may include functionality for probabilistically or deterministically linking first-party user records stored in first-party data store 230 (which can include personally-identifiable information (PII)) with third-party user data stored in data store 130 (which is aggregated data that does not uniquely identify individual users). At block 560, on-premises network 140 can receive the linked third-party user data and store the third-party user data locally within on-premises network 140. The third-party user data may be used to enrich first-party user records stored locally within on-premises network 140.

Figure 6:
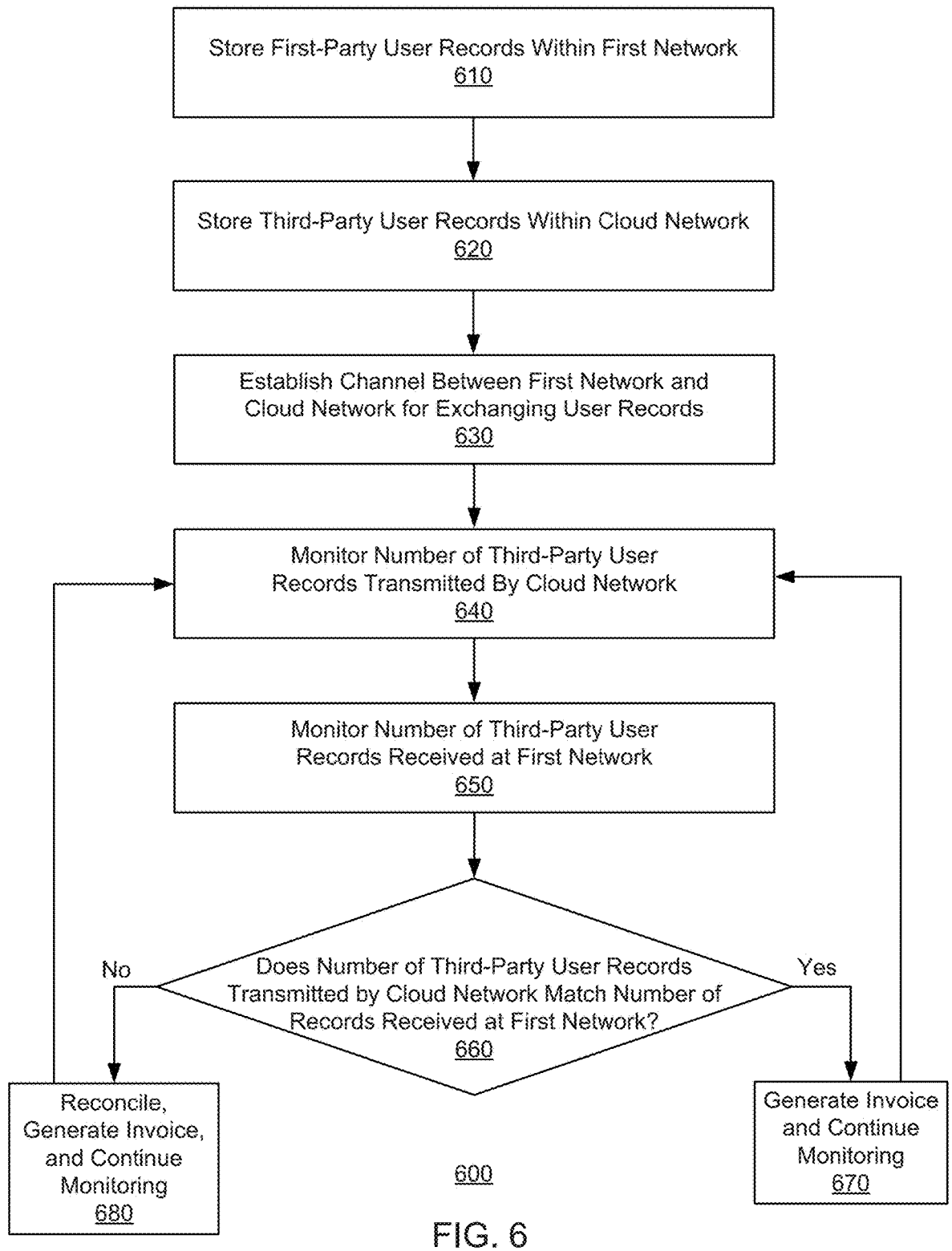
FIG. 6 is a flowchart illustrating an example of a process for linking third-party user records stored in a cloud network with first-party user records stored in an on-premises network, according to some aspects of the present disclosure.

FIG. 6 is a flowchart illustrating an example of a process 600 for linking third-party user records stored in a cloud network with first-party user records stored in on-premises network 140, according to some aspects of the present disclosure. Process 600 may be performed at least in part, for example, by on-premises network 140, cloud network 110 and/or any of the components described in FIG. 1, 2, or 3.

Further, as an example, on-premises network 140 can perform process 600 to monitor the amount of third-party user data that is received from cloud network 110 as linked third-party user profiles.

At block 610, first-party user data can be stored within a first network, such as on-premises network 140. In some implementations, the first-party user data may be collected by a private pixel server and then stored in first-party data store, such as first-party data store 230. At block 620, third-party user data is stored at or uploaded to cloud network 110. In some implementations, data providers feed third-party user data into data store 130 of cloud network 110. It will be appreciated that data store 130 can also store first-party user data (e.g., first-party user data for users who have consented to have their first-party user data uploaded to cloud network 110), second-party user data, and/or third-party user data.

At block 630, a communication channel is established between on-premises network 140 and cloud network 110 for exchanging user records (e.g., first-party, second-party, or third-party user records). For example, a communication channel can be established by configuring an API to exchange user records (e.g., a portion of user attributes contained in a first-party user record) between first-party data store 230, which is local to on-premises network 140, and data store 130, which is a cloud-based data store within cloud network 110.

At block 640, the communication channel can be configured to monitor the number (e.g., 10,000 non-unique third-party user records) or total amount (e.g., 3 TB) of third-party user data that is transmitted from data store 130 of cloud network 110 to on-premises network 140. The metering techniques described above can be implemented to monitor the number and/or the total amount of third-party user data that is received at on-premises network 140. For example, the communication channel can be configured to trigger a profile meter to count the number and/or size of third-party user records when user records are exchanged over the communication channel. The communication channel can also be configured to transmit a request for third-party user data from on-premises network 140. At block 650, the number or total amount of third-party user data that is received at on-premises network 140 is also monitored, for example, using a profile meter implemented using executable code triggered upon detecting user records received at on-premises network 140.

At block 660, reconciliation system 430 can be configured to reconcile the monitored number or total amount of third-party user data detected at blocks 640 and 650. If the monitored number or total amount of third-party user data at blocks 640 and 650 are the same, then process 600 continues to block 670, where an invoice is automatically generated to charge the company associated with the on-premises network 140 for the retrieved third-party user data. After the invoice is generated charging the company, the profile meters at on-premises network 140 and at cloud network 110 continue monitoring the number or total amount of third-party user data transmitted over the communication channel at blocks 640 and 650. If, however, the monitored number or total amount of third-party user data detected at blocks 640 and 650 is different, then, at block 680, reconciliation system 430 can be configured to reconcile the difference, generate an invoice for the reconciled difference, and continue monitoring at blocks 640 and 650. Non-limiting examples of reconciling different values at blocks 640 and 650 can include selecting the lower value, selecting the higher value, generating an average or other combination of the two values, or other suitable technique for determining a reconciled value.

Figure 7:
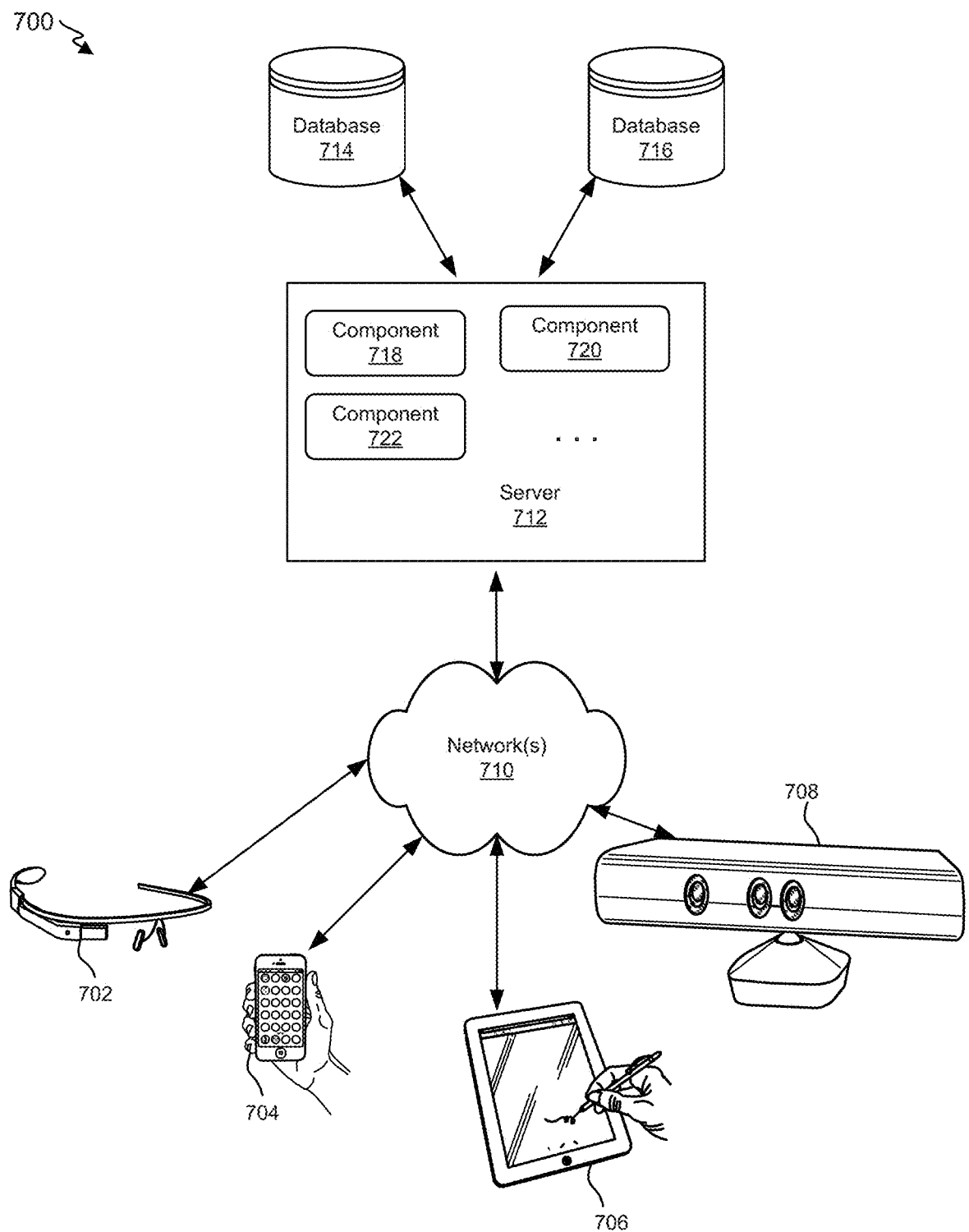
FIG. 7 is a simplified diagram illustrating a distributed system for implementing one of the embodiments.

FIG. 7 depicts a simplified diagram of a distributed system 700 for implementing one of the embodiments. In the illustrated embodiment, distributed system 700 includes one or more client computing devices 702, 704, 706, and 708, which are configured to execute and operate a client application such as a web browser, proprietary client (e.g., Oracle Forms), or the like over one or more network(s) 710. Server 712 may be communicatively coupled with remote client computing devices 702, 704, 706, and 708 via network 710.

In various embodiments, server 712 may be adapted to run one or more services or software applications provided by one or more of the components of the system. In some embodiments, these services may be offered as web-based or cloud services or under a Software as a Service (SaaS) model to the users of client computing devices 702, 704, 706, and/or 708. Users operating client computing devices 702, 704, 706, and/or 708 may in turn utilize one or more client applications to interact with server 712 to utilize the services provided by these components.

In the configuration depicted in the figure, the software components 718, 720 and 722 of system 700 are shown as being implemented on server 712. In other embodiments, one or more of the components of system 700 and/or the services provided by these components may also be implemented by one or more of the client computing devices 702, 704, 706, and/or 708. Users operating the client computing devices may then utilize one or more client applications to use the services provided by these components. These components may be implemented in hardware, firmware, software, or combinations thereof. It should be appreciated that various different system configurations are possible, which may be different from distributed system 700. The embodiment shown in the figure is thus one example of a distributed system for implementing an embodiment system and is not intended to be limiting.

Client computing devices 702, 704, 706, and/or 708 may be portable handheld devices (e.g., an iPhone®, cellular telephone, an iPad®, computing tablet, a personal digital assistant (PDA)) or wearable devices (e.g., a Google Glass® head mounted display), running software such as Microsoft Windows Mobile®, and/or a variety of mobile operating systems such as iOS, Windows Phone, Android, BlackBerry 10, Palm OS, and the like, and being Internet, e-mail, short message service (SMS), Blackberry®, or other communication protocol enabled. The client computing devices can be general purpose personal computers including, by way of example, personal computers and/or laptop computers running various versions of Microsoft Windows®, Apple Macintosh®, and/or Linux operating systems. The client computing devices can be workstation computers running any of a variety of commercially-available UNIX® or UNIX-like operating systems, including without limitation the variety of GNU/Linux operating systems, such as for example, Google Chrome OS. Alternatively, or in addition, client computing devices 702, 704, 706, and 708 may be any other electronic device, such as a thin-client computer, an Internet-enabled gaming system (e.g., a Microsoft Xbox gaming console with or without a Kinect® gesture input device), and/or a personal messaging device, capable of communicating over network(s) 710.

Although exemplary distributed system 700 is shown with four client computing devices, any number of client computing devices may be supported. Other devices, such as devices with sensors, etc., may interact with server 712.

Network(s) 710 in distributed system 700 may be any type of network familiar to those skilled in the art that can support data communications using any of a variety of commercially-available protocols, including without limitation TCP/IP (transmission control protocol/Internet protocol), SNA (systems network architecture), IPX (Internet packet exchange), AppleTalk, and the like. Merely by way of example, network(s) 710 can be a local area network (LAN), such as one based on Ethernet, Token-Ring and/or the like. Network(s) 710 can be a wide-area network and the Internet. It can include a virtual network, including without limitation a virtual private network (VPN), an intranet, an extranet, a public switched telephone network (PSTN), an infra-red network, a wireless network (e.g., a network operating under any of the Institute of Electrical and Electronics (IEEE) 802.11 suite of protocols, Bluetooth®, and/or any other wireless protocol); and/or any combination of these and/or other networks.

Server 712 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. In various embodiments, server 712 may be adapted to run one or more services or software applications described in the foregoing disclosure. For example, server 712 may correspond to a server for performing processing described above according to an embodiment of the present disclosure.

Server 712 may run an operating system including any of those discussed above, as well as any commercially available server operating system. Server 712 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle, Microsoft, Sybase, IBM (International Business Machines), and the like.

In some implementations, server 712 may include one or more applications to analyze and consolidate data feeds and/or event updates received from users of client computing devices 702, 704, 706, and 708. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), clickstream analysis tools, automobile traffic monitoring, and the like. Server 712 may also include one or more applications to display the data feeds and/or real-time events via one or more display devices of client computing devices 702, 704, 706, and 708.

Distributed system 700 may also include one or more databases 714 and 716. Databases 714 and 716 may reside in a variety of locations. By way of example, one or more of databases 714 and 716 may reside on a non-transitory storage medium local to (and/or resident in) server 712. Alternatively, databases 714 and 716 may be remote from server 712 and in communication with server 712 via a network-based or dedicated connection. In one set of embodiments, databases 714 and 716 may reside in a storage-area network (SAN). Similarly, any necessary files for performing the functions attributed to server 712 may be stored locally on server 712 and/or remotely, as appropriate. In one set of embodiments, databases 714 and 716 may include relational databases, such as databases provided by Oracle, that are adapted to store, update, and retrieve data in response to SQL-formatted commands.

Figure 8:
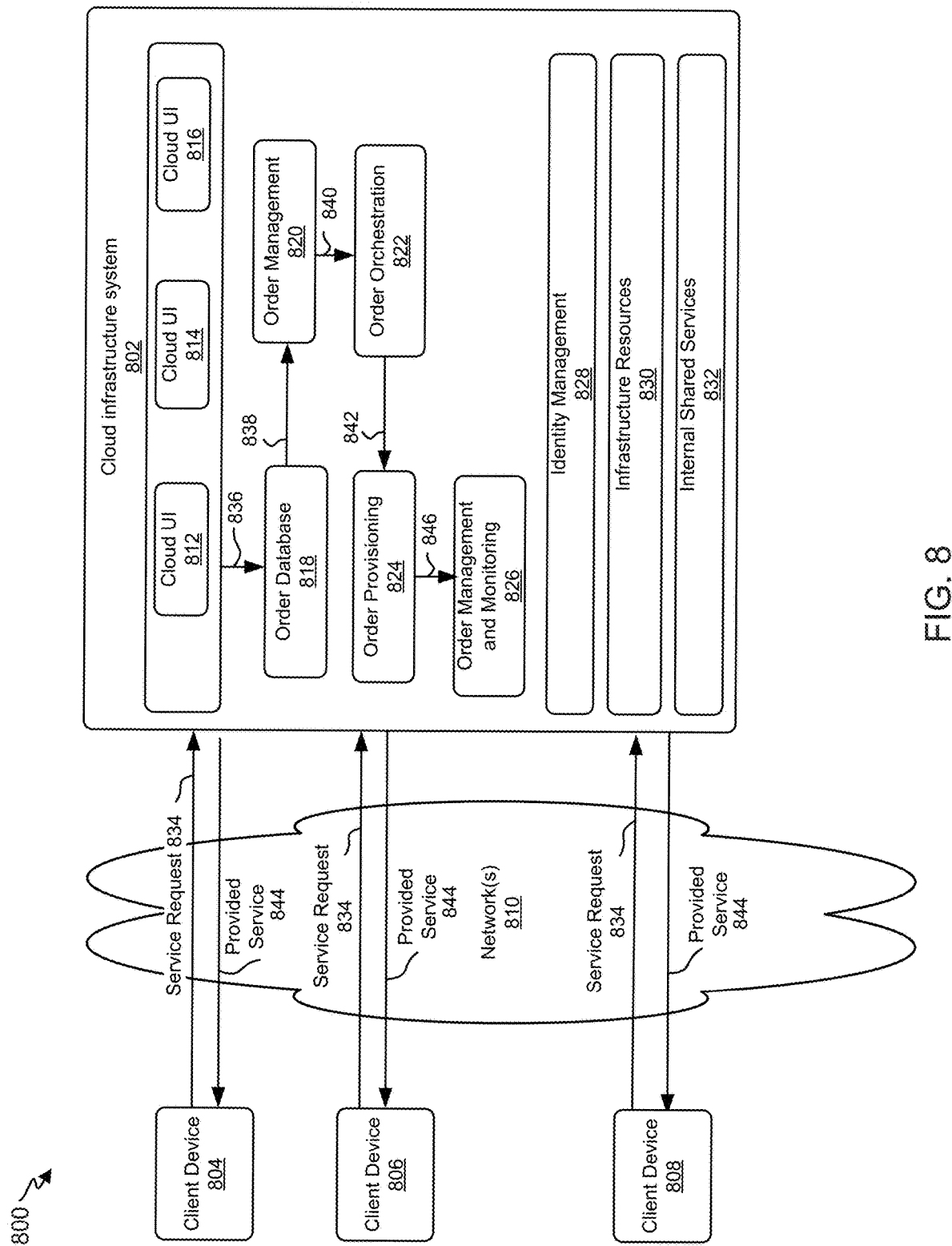
FIG. 8 is a simplified block diagram illustrating one or more components of a system environment.

FIG. 8 is a simplified block diagram of one or more components of a system environment 800 by which services provided by one or more components of an embodiment system may be offered as cloud services, in accordance with an embodiment of the present disclosure. In the illustrated embodiment, system environment 800 includes one or more client computing devices 804, 806, and 808 that may be used by users to interact with a cloud infrastructure system 802 that provides cloud services. The client computing devices may be configured to operate a client application such as a web browser, a proprietary client application (e.g., Oracle Forms), or some other application, which may be used by a user of the client computing device to interact with cloud infrastructure system 802 to use services provided by cloud infrastructure system 802.

It should be appreciated that cloud infrastructure system 802 depicted in the figure may have other components than those depicted. Further, the embodiment shown in the figure is only one example of a cloud infrastructure system that may incorporate an embodiment of the invention. In some other embodiments, cloud infrastructure system 802 may have more or fewer components than shown in the figure, may combine two or more components, or may have a different configuration or arrangement of components.

Client computing devices 804, 806, and 808 may be devices similar to those described above for 702, 704, 706, and 708.

Although exemplary system environment 800 is shown with three client computing devices, any number of client computing devices may be supported. Other devices such as devices with sensors, etc. may interact with cloud infrastructure system 802.

Network(s) 810 may facilitate communications and exchange of data between clients 804, 806, and 808 and cloud infrastructure system 802. Each network may be any type of network familiar to those skilled in the art that can support data communications using any of a variety of commercially-available protocols, including those described above for network(s) 710.

Cloud infrastructure system 802 may comprise one or more computers and/or servers that may include those described above for server 712.

In certain embodiments, services provided by the cloud infrastructure system may include a host of services that are made available to users of the cloud infrastructure system on demand, such as online data storage and backup solutions, Web-based e-mail services, hosted office suites and document collaboration services, database processing, managed technical support services, and the like. Services provided by the cloud infrastructure system can dynamically scale to meet the needs of its users. A specific instantiation of a service provided by cloud infrastructure system is referred to herein as a "service instance." In general, any service made available to a user via a communication network, such as the Internet, from a cloud service provider's system is referred to as a "cloud service." Typically, in a public cloud environment, servers and systems that make up the cloud service provider's system are different from the customer's own on-premises servers and systems. For example, a cloud service provider's system may host an application, and a user may, via a communication network such as the Internet, on demand, order and use the application.

In some examples, a service in a computer network cloud infrastructure may include protected computer network access to storage, a hosted database, a hosted web server, a software application, or other service provided by a cloud vendor to a user, or as otherwise known in the art. For example, a service can include password-protected access to remote storage on the cloud through the Internet. As another example, a service can include a web service-based hosted relational database and a script-language middleware engine for private use by a networked developer. As another example, a service can include access to an email software application hosted on a cloud vendor's web site.

In certain embodiments, cloud infrastructure system 802 may include a suite of applications, middleware, and database service offerings that are delivered to a customer in a self-service, subscription-based, elastically scalable, reliable, highly available, and secure manner. An example of such a cloud infrastructure system is the Oracle Public Cloud provided by the present assignee.

In various embodiments, cloud infrastructure system 802 may be adapted to automatically provision, manage and track a customer's subscription to services offered by cloud infrastructure system 802. Cloud infrastructure system 802 may provide the cloud services via different deployment models. For example, services may be provided under a public cloud model in which cloud infrastructure system 802 is owned by an organization selling cloud services (e.g., owned by Oracle) and the services are made available to the general public or different industry enterprises. As another example, services may be provided under a private cloud model in which cloud infrastructure system 802 is operated solely for a single organization and may provide services for one or more entities within the organization. The cloud services may also be provided under a community cloud model in which cloud infrastructure system 802 and the services provided by cloud infrastructure system 802 are shared by several organizations in a related community. The cloud services may also be provided under a hybrid cloud model, which is a combination of two or more different models.

In some embodiments, the services provided by cloud infrastructure system 802 may include one or more services provided under Software as a Service (SaaS) category, Platform as a Service (PaaS) category, Infrastructure as a Service (IaaS) category, or other categories of services including hybrid services. A customer, via a subscription order, may order one or more services provided by cloud infrastructure system 802. Cloud infrastructure system 802 then performs processing to provide the services in the customer's subscription order.

In some embodiments, the services provided by cloud infrastructure system 802 may include, without limitation, application services, platform services and infrastructure services. In some examples, application services may be provided by the cloud infrastructure system via a SaaS platform. The SaaS platform may be configured to provide cloud services that fall under the SaaS category. For example, the SaaS platform may provide capabilities to build and deliver a suite of on-demand applications on an integrated development and deployment platform. The SaaS platform may manage and control the underlying software and infrastructure for providing the SaaS services. By utilizing the services provided by the SaaS platform, customers can utilize applications executing on the cloud infrastructure system. Customers can acquire the application services without the need for customers to purchase separate licenses and support. Various different SaaS services may be provided. Examples include, without limitation, services that provide solutions for sales performance management, enterprise integration, and flexibility for large organizations.

In some embodiments, platform services may be provided by the cloud infrastructure system via a PaaS platform. The PaaS platform may be configured to provide cloud services that fall under the PaaS category. Examples of platform services may include without limitation services that enable organizations (such as Oracle) to consolidate existing applications on a shared, common architecture, as well as the ability to build new applications that leverage the shared services provided by the platform. The PaaS platform may manage and control the underlying software and infrastructure for providing the PaaS services. Customers can acquire the PaaS services provided by the cloud infrastructure system without the need for customers to purchase separate licenses and support. Examples of platform services include, without limitation, Oracle Java Cloud Service (JCS), Oracle Database Cloud Service (DBCS), and others.

By utilizing the services provided by the PaaS platform, customers can employ programming languages and tools supported by the cloud infrastructure system and also control the deployed services. In some embodiments, platform services provided by the cloud infrastructure system may include database cloud services, middleware cloud services (e.g., Oracle Fusion Middleware services), and Java cloud services. In one embodiment, database cloud services may support shared service deployment models that enable organizations to pool database resources and offer customers a Database as a Service in the form of a database cloud. Middleware cloud services may provide a platform for customers to develop and deploy various cloud applications, and Java cloud services may provide a platform for customers to deploy Java applications, in the cloud infrastructure system.

Various different infrastructure services may be provided by an IaaS platform in the cloud infrastructure system. The infrastructure services facilitate the management and control of the underlying computing resources, such as storage, networks, and other fundamental computing resources for customers utilizing services provided by the SaaS platform and the PaaS platform.

In certain embodiments, cloud infrastructure system 802 may also include infrastructure resources 830 for providing the resources used to provide various services to customers of the cloud infrastructure system. In one embodiment, infrastructure resources 830 may include pre-integrated and optimized combinations of hardware, such as servers, storage, and networking resources to execute the services provided by the PaaS platform and the SaaS platform.

In some embodiments, resources in cloud infrastructure system 802 may be shared by multiple users and dynamically re-allocated per demand. Additionally, resources may be allocated to users in different time zones. For example, cloud infrastructure system 830 may enable a first set of users in a first time zone to utilize resources of the cloud infrastructure system for a specified number of hours and then enable the re-allocation of the same resources to another set of users located in a different time zone, thereby maximizing the utilization of resources.

In certain embodiments, a number of internal shared services 832 may be provided that are shared by different components or modules of cloud infrastructure system 802 and by the services provided by cloud infrastructure system 802. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

In certain embodiments, cloud infrastructure system 802 may provide comprehensive management of cloud services (e.g., SaaS, PaaS, and IaaS services) in the cloud infrastructure system. In one embodiment, cloud management functionality may include capabilities for provisioning, managing and tracking a customer's subscription received by cloud infrastructure system 802, and the like.

In one embodiment, as depicted in the figure, cloud management functionality may be provided by one or more modules, such as an order management module 820, an order orchestration module 822, an order provisioning module 824, an order management and monitoring module 826, and an identity management module 828. These modules may include or be provided using one or more computers and/or servers, which may be general purpose computers, specialized server computers, server farms, server clusters, or any other appropriate arrangement and/or combination.

In exemplary operation 834, a customer using a client device, such as client device 804, 806 or 808, may interact with cloud infrastructure system 802 by requesting one or more services provided by cloud infrastructure system 802 and placing an order for a subscription for one or more services offered by cloud infrastructure system 802. In certain embodiments, the customer may access a cloud User Interface (UI), cloud UI 812, cloud UI 814 and/or cloud UI 816 and place a subscription order via these UIs. The order information received by cloud infrastructure system 802 in response to the customer placing an order may include information identifying the customer and one or more services offered by the cloud infrastructure system 802 that the customer intends to subscribe to.

After an order has been placed by the customer, the order information is received via the cloud UIs, 812, 814 and/or 816.

At operation 836, the order is stored in order database 818. Order database 818 can be one of several databases operated by cloud infrastructure system 818 and operated in conjunction with other system elements.

At operation 838, the order information is forwarded to an order management module 820. In some instances, order management module 820 may be configured to perform billing and accounting functions related to the order, such as verifying the order, and upon verification, booking the order.

At operation 840, information regarding the order is communicated to an order orchestration module 822. Order orchestration module 822 may utilize the order information to orchestrate the provisioning of services and resources for the order placed by the customer. In some instances, order orchestration module 822 may orchestrate the provisioning of resources to support the subscribed services using the services of order provisioning module 824.

In certain embodiments, order orchestration module 822 enables the management of processes associated with each order and applies logic to determine whether an order should proceed to provisioning. At operation 842, upon receiving an order for a new subscription, order orchestration module 822 sends a request to order provisioning module 824 to allocate resources and configure those resources needed to fulfill the subscription order. Order provisioning module 824 enables the allocation of resources for the services ordered by the customer. Order provisioning module 824 provides a level of abstraction between the cloud services provided by cloud infrastructure system 800 and the physical implementation layer that is used to provision the resources for providing the requested services. Order orchestration module 822 may thus be isolated from implementation details, such as whether or not services and resources are actually provisioned on the fly or pre-provisioned and only allocated/assigned upon request.

At operation 844, once the services and resources are provisioned, a notification of the provided service may be sent to customers on client devices 804, 806 and/or 808 by order provisioning module 824 of cloud infrastructure system 802.

At operation 846, the customer's subscription order may be managed and tracked by an order management and monitoring module 826. In some instances, order management and monitoring module 826 may be configured to collect usage statistics for the services in the subscription order, such as the amount of storage used, the amount data transferred, the number of users, and the amount of system up time and system down time.

In certain embodiments, cloud infrastructure system 800 may include an identity management module 828. Identity management module 828 may be configured to provide identity services, such as access management and authorization services in cloud infrastructure system 800. In some embodiments, identity management module 828 may control information about customers who wish to utilize the services provided by cloud infrastructure system 802. Such information can include information that authenticates the identities of such customers and information that describes which actions those customers are authorized to perform relative to various system resources (e.g., files, directories, applications, communication ports, memory segments, etc.) Identity management module 828 may also include the management of descriptive information about each customer and about how and by whom that descriptive information can be accessed and modified.

Figure 9:
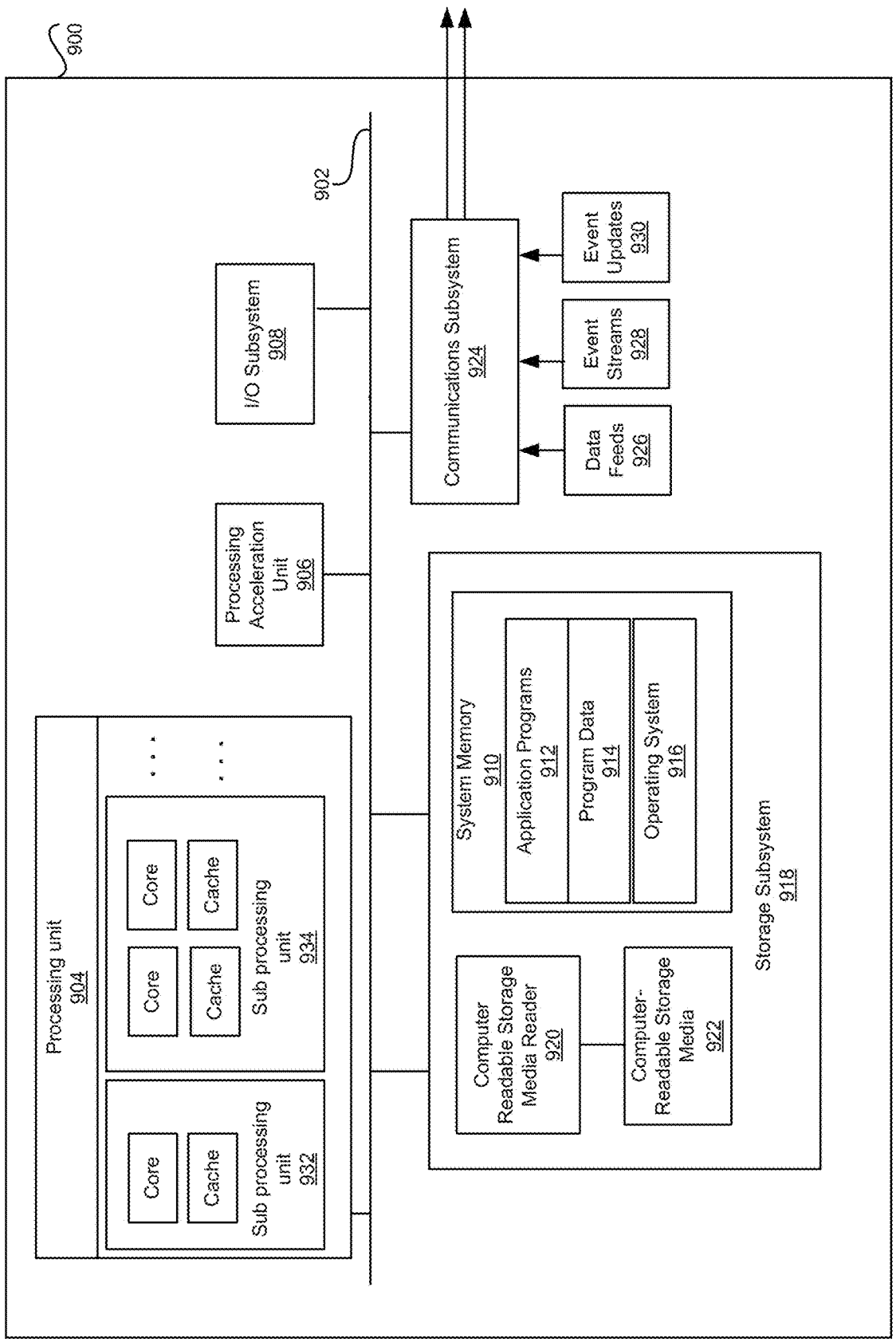
FIG. 9 illustrates an exemplary computer system, in which various embodiments of the present invention may be implemented.

FIG. 9 illustrates an exemplary computer system 900, in which various embodiments of the present invention may be implemented. The system 900 may be used to implement any of the computer systems described above. As shown in the figure, computer system 900 includes a processing unit 904 that communicates with a number of peripheral subsystems via a bus subsystem 902. These peripheral subsystems may include a processing acceleration unit 906, an I/O subsystem 908, a storage subsystem 918 and a communications subsystem 924. Storage subsystem 918 includes tangible computer-readable storage media 922 and a system memory 910.

Bus subsystem 902 provides a mechanism for letting the various components and subsystems of computer system 900 communicate with each other as intended. Although bus subsystem 902 is shown schematically as a single bus, alternative embodiments of the bus subsystem may utilize multiple buses. Bus subsystem 902 may be any of several types of bus structures including a memory bus or memory controller, a peripheral bus, and a local bus using any of a variety of bus architectures. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which can be implemented as a Mezzanine bus manufactured to the IEEE P1386.1 standard.

Processing unit 904, which can be implemented as one or more integrated circuits (e.g., a conventional microprocessor or microcontroller), controls the operation of computer system 900. One or more processors may be included in processing unit 904. These processors may include single core or multicore processors. In certain embodiments, processing unit 904 may be implemented as one or more independent processing units 932 and/or 934 with single or multicore processors included in each processing unit. In other embodiments, processing unit 904 may also be implemented as a quad-core processing unit formed by integrating two dual-core processors into a single chip.

In various embodiments, processing unit 904 can execute a variety of programs in response to program code and can maintain multiple concurrently executing programs or processes. At any given time, some or all of the program code to be executed can be resident in processor(s) 904 and/or in storage subsystem 918. Through suitable programming, processor(s) 904 can provide various functionalities described above. Computer system 900 may additionally include a processing acceleration unit 906, which can include a digital signal processor (DSP), a special-purpose processor, and/or the like.

I/O subsystem 908 may include user interface input devices and user interface output devices. User interface input devices may include a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may include, for example, motion sensing and/or gesture recognition devices such as the Microsoft Kinect® motion sensor that enables users to control and interact with an input device, such as the Microsoft Xbox® 360 game controller, through a natural user interface using gestures and spoken commands. User interface input devices may also include eye gesture recognition devices such as the Google Glass® blink detector that detects eye activity (e.g., 'blinking' while taking pictures and/or making a menu selection) from users and transforms the eye gestures as input into an input device (e.g., Google Glass®). Additionally, user interface input devices may include voice recognition sensing devices that enable users to interact with voice recognition systems (e.g., Siri® navigator), through voice commands.

User interface input devices may also include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like.

User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 900 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 900 may comprise a storage subsystem 918 that comprises software elements, shown as being currently located within a system memory 910. System memory 910 may store program instructions that are loadable and executable on processing unit 904, as well as data generated during the execution of these programs.

Depending on the configuration and type of computer system 900, system memory 910 may be volatile (such as random access memory (RAM)) and/or non-volatile (such as read-only memory (ROM), flash memory, etc.) The RAM typically contains data and/or program modules that are immediately accessible to and/or presently being operated and executed by processing unit 904. In some implementations, system memory 910 may include multiple different types of memory, such as static random access memory (SRAM) or dynamic random access memory (DRAM). In some implementations, a basic input/output system (BIOS), containing the basic routines that help to transfer information between elements within computer system 900, such as during start-up, may typically be stored in the ROM. By way of example, and not limitation, system memory 910 also illustrates application programs 912, which may include client applications, Web browsers, mid-tier applications, relational database management systems (RDBMS), etc., program data 914, and an operating system 916. By way of example, operating system 916 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® 10 OS, and Palm® OS operating systems.

Storage subsystem 918 may also provide a tangible computer-readable storage medium for storing the basic programming and data constructs that provide the functionality of some embodiments. Software (programs, code modules, instructions) that when executed by a processor provide the functionality described above may be stored in storage subsystem 918. These software modules or instructions may be executed by processing unit 904. Storage subsystem 918 may also provide a repository for storing data used in accordance with the present invention.

Storage subsystem 900 may also include a computer-readable storage media reader 920 that can further be connected to computer-readable storage media 922. Together and, optionally, in combination with system memory 910, computer-readable storage media 922 may comprehensively represent remote, local, fixed, and/or removable storage devices plus storage media for temporarily and/or more permanently containing, storing, transmitting, and retrieving computer-readable information.

Computer-readable storage media 922 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 900.

By way of example, computer-readable storage media 922 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk such as a CD ROM, DVD, and Blu-Ray® disk, or other optical media. Computer-readable storage media 922 may include, but is not limited to, Zip® drives, flash memory cards, universal serial bus (USB) flash drives, secure digital (SD) cards, DVD disks, digital video tape, and the like. Computer-readable storage media 922 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 900.

Communications subsystem 924 provides an interface to other computer systems and networks. Communications subsystem 924 serves as an interface for receiving data from and transmitting data to other systems from computer system 900. For example, communications subsystem 924 may enable computer system 900 to connect to one or more devices via the Internet. In some embodiments communications subsystem 924 can include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1202.11 family standards, or other mobile communication technologies, or any combination thereof), global positioning system (GPS) receiver components, and/or other components. In some embodiments communications subsystem 924 can provide wired network connectivity (e.g., Ethernet) in addition to or instead of a wireless interface.

In some embodiments, communications subsystem 924 may also receive input communication in the form of structured and/or unstructured data feeds 926, event streams 928, event updates 930, and the like on behalf of one or more users who may use computer system 900.

By way of example, communications subsystem 924 may be configured to receive data feeds 926 in real-time from users of social networks and/or other communication services such as Twitter® feeds, Facebook® updates, web feeds such as Rich Site Summary (RSS) feeds, and/or real-time updates from one or more third party information sources.

Additionally, communications subsystem 924 may also be configured to receive data in the form of continuous data streams, which may include event streams 928 of real-time events and/or event updates 930, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 924 may also be configured to output the structured and/or unstructured data feeds 926, event streams 928, event updates 930, and the like to one or more databases that may be in communication with one or more streaming data source computers coupled to computer system 900.

Computer system 900 can be one of various types, including a handheld portable device (e.g., an iPhone® cellular phone, an iPad® computing tablet, a PDA), a wearable device (e.g., a Google Glass® head mounted display), a PC, a workstation, a mainframe, a kiosk, a server rack, or any other data processing system.

Due to the ever-changing nature of computers and networks, the description of computer system 900 depicted in the figure is intended only as a specific example. Many other configurations having more or fewer components than the system depicted in the figure are possible. For example, customized hardware might also be used and/or particular elements might be implemented in hardware, firmware, software (including applets), or a combination. Further, connection to other computing devices, such as network input/output devices, may be employed. Based on the disclosure and teachings provided herein, a person of ordinary skill in the art will appreciate other ways and/or methods to implement the various embodiments.

In the foregoing specification, aspects of the invention are described with reference to specific embodiments thereof, but those skilled in the art will recognize that the invention is not limited thereto. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive.

What is claimed is:

1. A computer-implemented method comprising:
   storing a plurality of first-party user records within a first network, each first-party user record of the plurality of first-party user records including one or more first-party user features, and each first-party user feature of the one or more first-party user features being generated based on an interaction between a user device and the first network;
   storing a plurality of third-party user records within a cloud network, each third-party user record of the plurality of third-party user records including one or more third-party user features, and each third-party user feature of the one or more third-party user features being generated based on an interaction between a user device and a second network;
   establishing a communication channel between the first network and the cloud network, the communication channel being configured to transmit a first-party user feature from the first network to the cloud network or a third-party user record from the cloud network to the first network;
   detecting a communication over the communication channel, the communication originating from the first network, the communication corresponding to a request to map a first-party user record of the plurality of first-party user records to one or more third-party user records stored within the cloud network;
   monitoring a number of the one or more third-party user records received from the cloud network in response to the request from the first network, the monitoring being performed at each of the first network and the cloud network;
   determining that the number of the one or more third-party user records received by the first network matches the number of the one or more third-party user records transmitted by the cloud network;
   generating a value based on the number of the one or more third-party user records received by the first network that matched the number of the one or more third-party user records transmitted by the cloud network; and
   exchanging the value from the first network for the one or more third-party user records transmitted by the cloud network.

2. The computer-implemented method of claim 1, further comprising:
   determining whether a maximum value associated with the first network has been exceeded, the maximum value being defined by a user associated with the first network;
   wherein:
     when the maximum value has not been exceeded, proceeding with processing the request received by the first network; and
     when the maximum value has been exceeded, denying the request to map the first-party user record to the one or more third-party user records stored within the cloud network, and transmitting a signal over the communication channel to the first network, the signal indicating that the request has been denied.

3. The computer-implemented method of claim 2, wherein the maximum value is defined by the user accessing an interface associated with the first network, the interface enabling the user to define a configuration of one or more cloud services provided by the cloud network.

4. The computer-implemented method of claim 1, wherein the first network is an on-premises network or a virtual private cloud network, wherein the plurality of first-party user records are generated in response to one or more user devices navigating a web page hosted by the first network.

5. The computer-implemented method of claim 1, wherein the monitoring of the number of the one or more third-party user records received by the first network includes using a code-implemented meter executed at the first network.

6. The computer-implemented method of claim 1, wherein the monitoring of the number of the one or more third-party user records transmitted by the cloud network includes using a code-implemented meter executed at the cloud network.

7. The computer-implemented method of claim 1, wherein the monitoring further comprises:
   detecting the number of the one or more third-party user records received by the first network;
   detecting the number of the one or more third-party user records transmitted by the cloud network;
   comparing the number of the one or more third-party user records received by the first network with the number of the one or more third-party user records transmitted by the cloud network; and
   generating the value based on the comparison.

8. A system, comprising:
   one or more processors; and a non-transitory computer-readable storage medium containing instructions which, when executed on the one or more processors, cause the one or more processors to perform operations including:
  storing a plurality of first-party user records within a first network, each first-party user record of the plurality of first-party user records including one or more first-party user features, and each first-party user feature of the one or more first-party user features being generated based on an interaction between a user device and the first network;
  storing a plurality of third-party user records within a cloud network, each third-party user record of the plurality of third-party user records including one or more third-party user features, and each third-party user feature of the one or more third-party user features being generated based on an interaction between a user device and a second network;
  establishing a communication channel between the first network and the cloud network, the communication channel being configured to transmit a first-party user feature from the first network to the cloud network or a third-party user record from the cloud network to the first network;
  detecting a communication over the communication channel, the communication originating from the first network, the communication corresponding to a request to map a first-party user record of the plurality of first-party user records to one or more third-party user records stored within the cloud network;
  monitoring a number of the one or more third-party user records received from the cloud network in response to the request from the first network, the monitoring being performed at each of the first network and the cloud network;
  determining that the number of the one or more third-party user records received by the first network matches the number of the one or more third-party user records transmitted by the cloud network;
  generating a value based on the number of the one or more third-party user records received by the first network that matched the number of the one or more third-party user records transmitted by the cloud network; and
  exchanging the value from the first network for the one or more third-party user records transmitted by the cloud network.

9. The system of claim 8, wherein the operations further comprise:
  determining whether a maximum value associated with the first network has been exceeded, the maximum value being defined by a user associated with the first network;
  wherein:
    when the maximum value has not been exceeded, proceeding with processing the request received by the first network; and
    when the maximum value has been exceeded, denying the request to map the first-party user record to the one or more third-party user records stored within the cloud network, and transmitting a signal over the communication channel to the first network, the signal indicating that the request has been denied.

10. The system of claim 9, wherein the maximum value is defined by the user accessing an interface associated with the first network, the interface enabling the user to define a configuration of one or more cloud services provided by the cloud network.

11. The system of claim 8, wherein the first network is an on-premises network or a virtual private cloud network, wherein the plurality of first-party user records are generated in response to one or more user devices navigating a web page hosted by the first network.

12. The system of claim 8, wherein the monitoring of the number of the one or more third-party user records received by the first network includes using a code-implemented meter executed at the first network.

13. The system of claim 8, wherein the monitoring of the number of the one or more third-party user records transmitted by the cloud network includes using a code-implemented meter executed at the cloud network.

14. The system of claim 8, wherein the operation of monitoring further comprises:
  detecting the number of the one or more third-party user records received by the first network;
  detecting the number of the one or more third-party user records transmitted by the cloud network;
  comparing the number of the one or more third-party user records received by the first network with the number of the one or more third-party user records transmitted by the cloud network; and
  generating the value based on the comparison.

15. A computer-program product tangibly embodied in a non-transitory machine-readable storage medium, including instructions configured to cause a processing apparatus to perform operations including:
  storing a plurality of first-party user records within a first network, each first-party user record of the plurality of first-party user records including one or more first-party user features, and each first-party user feature of the one or more first-party user features being generated based on an interaction between a user device and the first network;
  storing a plurality of third-party user records within a cloud network, each third-party user record of the plurality of third-party user records including one or more third-party user features, and each third-party user feature of the one or more third-party user features being generated based on an interaction between a user device and a second network;
  establishing a communication channel between the first network and the cloud network, the communication channel being configured to transmit a first-party user feature from the first network to the cloud network or a third-party user record from the cloud network to the first network;
  detecting a communication over the communication channel, the communication originating from the first network, the communication corresponding to a request to map a first-party user record of the plurality of first-party user records to one or more third-party user records stored within the cloud network;
  monitoring a number of the one or more third-party user records received from the cloud network in response to the request from the first network, the monitoring being performed at each of the first network and the cloud network;
  determining that the number of the one or more third-party user records received by the first network matches the number of the one or more third-party user records transmitted by the cloud network;

generating a value based on the number of the one or more third-party user records received by the first network that matched the number of the one or more third-party user records transmitted by the cloud network; and exchanging the value from the first network for the one or more third-party user records transmitted by the cloud network.

16. The computer-program product of claim 15, wherein the operations further comprise:

determining whether a maximum value associated with the first network has been exceeded, the maximum value being defined by a user associated with the first network;

wherein:

when the maximum value has not been exceeded, proceeding with processing the request received by the first network; and when the maximum value has been exceeded, denying the request to map the first-party user record to the one or more third-party user records stored within the cloud network, and transmitting a signal over the communication channel to the first network, the signal indicating that the request has been denied.

17. The computer-program product of claim 16, wherein the maximum value is defined by the user accessing an interface associated with the first network, the interface enabling the user to define a configuration of one or more cloud services provided by the cloud network.

18. The computer-program product of claim 15, wherein the first network is an on-premises network or a virtual private cloud network, wherein the plurality of first-party user records are generated in response to one or more user devices navigating a web page hosted by the first network.

19. The computer-program product of claim 15, wherein the monitoring of the number of the one or more third-party user records received by the first network includes using a code-implemented meter executed at the first network.

20. The computer-program product of claim 15, wherein the monitoring of the number of the one or more third-party user records transmitted by the cloud network includes using a code-implemented meter executed at the cloud network.

\* \* \* \* \*

UNITED STATES PATENT AND TRADEMARK OFFICE
CERTIFICATE OF CORRECTION

PATENT NO. : 11,201,932 B2
APPLICATION NO. : 17/065238
DATED : December 14, 2021
INVENTOR(S) : Deo et al.

Page 1 of 1

It is certified that error appears in the above-identified patent and that said Letters Patent is hereby corrected as shown below:

In the Specification

In Column 1, Line 9, delete "SYSTEMS" and insert -- "SYSTEMS --, therefor.

In Column 1, Line 10, after "SERVICES" insert -- ON --.

In Column 20, Line 30, delete "Uls." and insert -- UIs. --, therefor.

In Column 24, Line 42, delete "standards," and insert -- standards), --, therefor.

Signed and Sealed this
Fifth Day of April, 2022

Drew Hirshfeld
*Performing the Functions and Duties of the*
*Under Secretary of Commerce for Intellectual Property and*
*Director of the United States Patent and Trademark Office*